(12) United States Patent
Sweeney

(10) Patent No.: US 10,079,777 B2
(45) Date of Patent: Sep. 18, 2018

(54) APPARATUS, SYSTEMS, AND METHODS OF ALLOCATING HETEROGENEOUS RESOURCES

(71) Applicant: Siemens Industry, Inc., Alpharetta, GA (US)

(72) Inventor: Christopher M. Sweeney, Johnson City, TN (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 93 days.

(21) Appl. No.: 14/273,001

(22) Filed: May 8, 2014

(65) Prior Publication Data

US 2015/0326498 A1    Nov. 12, 2015

(51) Int. Cl.
*H04L 12/911* (2013.01)
*H04L 29/06* (2006.01)
*G06F 9/50* (2006.01)

(52) U.S. Cl.
CPC .......... *H04L 47/822* (2013.01); *G06F 9/5011* (2013.01); *H04L 67/42* (2013.01)

(58) Field of Classification Search
CPC ....... H04L 47/822; H04L 67/42; G06F 9/5011
See application file for complete search history.

(56) References Cited

U.S. PATENT DOCUMENTS

| | | | | |
|---|---|---|---|---|
| 7,673,031 B1* | 3/2010 | Jalagam | ............. | H04L 67/1097 709/223 |
| 7,707,290 B2* | 4/2010 | Bandholz | ................ | G06F 21/57 709/220 |
| 2008/0126547 A1* | 5/2008 | Waldspurger | ......... | G06F 9/4881 709/226 |
| 2009/0327303 A1* | 12/2009 | Ootjers | ............... | H04L 67/1097 |
| 2013/0091089 A1* | 4/2013 | Noureddine | ...... | G06F 17/30592 707/602 |
| 2013/0144406 A1* | 6/2013 | Blei | ..................... | G05B 19/054 700/28 |
| 2013/0318397 A1* | 11/2013 | Jamison | ................... | G06F 8/63 714/32 |
| 2015/0089075 A1* | 3/2015 | Strigeus | ............ | G06F 17/30165 709/231 |

OTHER PUBLICATIONS

PCT International Search Report dated Jul. 23, 2015 corresponding to PCT International Application No. PCT/US2015/025273 filed Apr. 10, 2015 (10 pages).

* cited by examiner

*Primary Examiner* — Nicholas R Taylor
*Assistant Examiner* — Tania M Pena-Santana

(57) ABSTRACT

A system for allocating heterogeneous resources may include a client device, a plurality of heterogeneous resources, and a server host. The client device may be configured to request access to one or more specific resources, and the server host may be configured to allocate the requested resource(s) to the client device in response to the server host determining the availability of the requested resource(s). The client device may then establish direct and/or exclusive access to the requested resource(s) and communicate commands to and exchange data with the requested resource(s), bypassing the server host. The server host may also be configured to queue requests for unavailable resources and to later grant access to those resources upon those resources becoming available. Methods of allocating heterogeneous resources are also provided, as are other aspects.

18 Claims, 7 Drawing Sheets

APPARATUS, SYSTEMS, AND METHODS OF ALLOCATING HETEROGENEOUS RESOURCES

FIELD

The invention relates generally to allocating heterogeneous resources in a computer-networked environment.

BACKGROUND

In some computer-networked environments, a user may request via a client device access to one or more heterogeneous resources by submitting a request to a server host. The client device may be, e.g., a personal computer, and the heterogeneous resources may include various electronic components, software, and/or other physical devices or assets, such as, e.g., storage devices, processors, programmable logic controllers (PLCs), parts for an assembly line, computer programs, and/or data. A server host may allocate a requested resource to a user (i.e., to a client device) if the resource is available. In some known computer-networked environments, if the resource is not available, the request may be denied, and the user may have to re-submit the request at one or more later times until the requested resource is available. In addition to delaying the user's task involving the requested resource, the inconvenience of having to re-submit one or possibly more requests for that resource may also prevent the user from attending to other tasks.

In some known computer-networked environments, a server host may process a request for multiple heterogeneous resources from a first user as separate individual requests. As those separate individual requests are sequentially processed, an intervening request from another user for one or more of the same resources may result in the first user being denied access to one or more of the first user's requested resources. Again, the first user may have to inconveniently re-submit one or possibly more requests until access to all of the requested resources is granted, thus delaying the first user's task involving the multiple resources.

Also, in some known computer-networked environments, users may not be able to request access to one or more specific resources, but only to one or more general types of resources. For example, a user may only be able to request access to a "programmable logic controller" (PLC), but not to one or more specific PLCs configured in a certain way or having certain features relevant to the user's task. This may significantly delay a user's task while the user may have to repeatedly request access to the general type of desired resource until access to the one or more specific desired resources of that type is granted.

Furthermore, in some known computer-networked environments, access granted to a user for a requested resource may not result in the user having direct and/or exclusive access to that resource, but instead, may only result in the server host having access to the requested resource to perform a task submitted by the user. Although the user may monitor the status and ultimately review the results of the performed task, the user may not be able to, e.g., make real time changes or additions to the task while the task is being performed by the server host.

Accordingly, improved apparatus, systems, and methods of allocating heterogeneous resources in a computer-networked environment are desired.

SUMMARY

According to one aspect, a resource allocation system is provided that includes a client device comprising a processor and a memory, a plurality of heterogeneous resources including a first resource, and a server host comprising a processor and a memory, the server host in communication with the client device. The server host is configured to receive a request from the client device for the first resource, determine whether the first resource is available, queue the request in response to the server host determining that the first resource is not available, and grant the client device direct or exclusive access to the first resource in response to the server host determining that the first resource is available.

According to another aspect, a method of allocating heterogeneous resources is provided. The method includes receiving at a server host a request from a first client device for a first resource of a plurality of heterogeneous resources, determining by the server host whether the first resource is available, queuing the request at the server host in response to the server host determining that the first resource is not available, and granting the first client device direct or exclusive access to the first resource in response to the server host determining that the first resource is available.

According to a further aspect, a second method of allocating heterogeneous resources is provided. The method includes sending from a first client device to a server host a request for a first resource of a plurality of heterogeneous resources, receiving at the first client device a first communication from the server host granting direct or exclusive access to the first resource, establishing direct or exclusive access to the first resource by the first client device in response to receiving the first communication, communicating commands and data between the first client device and the first resource, bypassing the server host, in response to the establishing direct or exclusive access, and sending a second communication from the first client device to the server host releasing the first resource in response to the first client device terminating the direct or exclusive access.

Still other aspects, features, and advantages of the invention may be readily apparent from the following detailed description wherein a number of example embodiments and implementations are described and illustrated, including the best mode contemplated for carrying out the invention. The invention may also include other and different embodiments, and its several details may be modified in various respects, all without departing from the scope of the invention. Accordingly, the drawings and descriptions are to be regarded as illustrative in nature, and not as restrictive. The invention covers all modifications, equivalents, and alternatives falling within the scope of the invention.

BRIEF DESCRIPTION OF DRAWINGS

Persons skilled in the art will understand that the drawings, described below, are for illustrative purposes only. The drawings are not necessarily drawn to scale and are not intended to limit the scope of this disclosure in any way.

DETAILED DESCRIPTION

Figure 1:
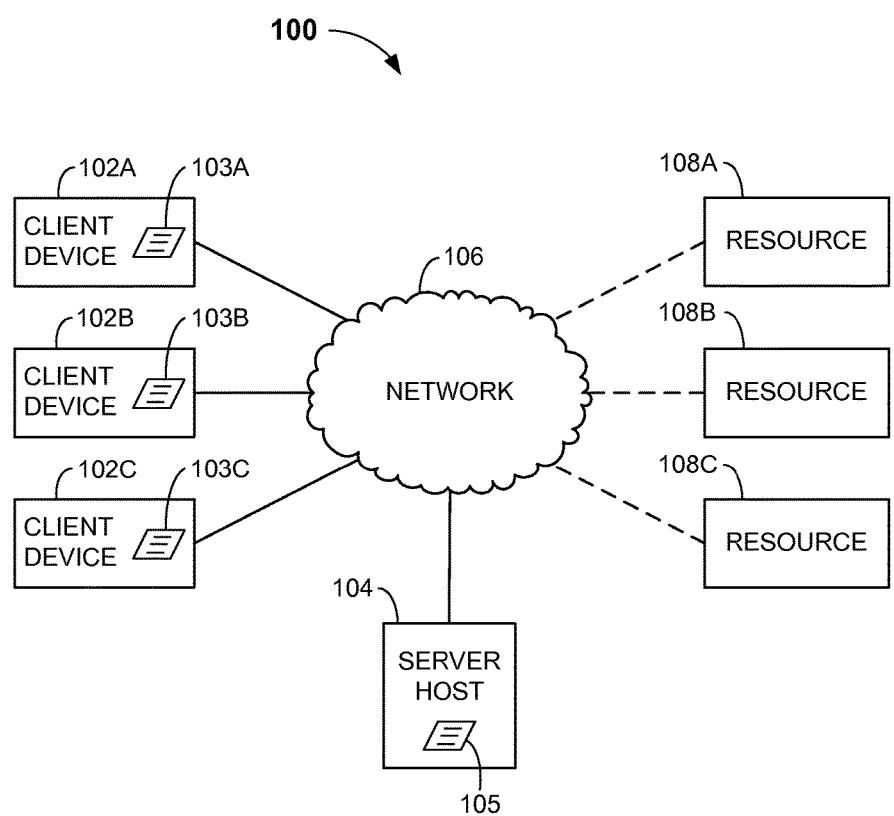
FIG. 1 illustrates a block diagram of a system for allocating heterogeneous resources according to embodiments.

Reference will now be made in detail to the example embodiments of this disclosure, which are illustrated in the accompanying drawings. Wherever possible, the same reference numbers will be used throughout the drawings to refer to the same or like parts.

The aforementioned problems of allocating heterogeneous resources in known computer-networked environments may be overcome by one or more embodiments of the invention. In one aspect, a system, which may be based on a client-server model or other distributed application structure, may include a server configured to allocate one or more requested heterogeneous resources to a client requesting those resources. But instead of the server performing a task submitted by the client as in some known systems, the server may be configured to allocate the requested resource(s) to the client such that the client may directly and/or exclusively access the requested resource(s) to directly and/or exclusively perform tasks involving the requested resource(s). That is, a client may have direct and/or exclusive access to and control of the resource(s) to which the client has been granted access by the server. The server, therefore, may not be used to execute client tasks involving the allocated resources.

In another aspect, a server may be configured to queue any requests that cannot be granted because, e.g., one or more of the requested resources are not available. Upon an unavailable resource becoming available, such as, e.g., upon the server receiving a communication from another client that a resource is being released, the server may then grant access to the client whose request for that resource had been queued.

In a further aspect, a server may be configured to process in a single operation a request for multiple heterogeneous resources received from a first client. That is, the server may process that request as one request and not as a series of separate individual requests that may be subject to an intervening request for one or more of the same resources from another client that may prevent the first client from being granted access to all of the first client's requested resources. Thus, the server may determine whether or not each one of the multiple requested heterogeneous resources is available before processing any other resource requests. This may avoid undesirable race conditions for the same resource and may result in a system that more efficiently allocates resources than in some known resource allocation systems.

In another aspect, one or more specific individual resources may be requested by a client. The request for one or more specific individual resources may include various selection criteria including, e.g., a resource model number, a resource address, an amount of memory available in a resource, an I/O (input/output) configuration of a resource, and/or a selection of modules attached to a resource. Other suitable selection criteria may be used. Thus, e.g., in a system having programmable logic controllers (PLCs) as resources, a client may request a specifically-configured PLC having certain desired features.

In some embodiments, the server (referred to hereinafter as a server application) in one or more of the above aspects may reside on a server host and a copy of the client (referred to hereinafter as a client application) may reside on each one or more client devices in communication with the server host. Any one or more of the client devices may be, e.g., a personal computer, a smart device, or the like. The server host may be any suitable computer, controller, or the like. In other embodiments, a combined client-server application may reside on a single computer or like device.

In other aspects, methods of allocating heterogeneous resources are provided, as will be explained in greater detail below in connection with FIGS. 1-6.

FIG. 1 illustrates a system 100 for allocating heterogeneous resources in accordance with one or more embodiments. System 100 may be a client-server based system that may include a plurality of client devices 102A-C, a server host 104, a network 106, and a plurality of heterogeneous resources 108A-C. Client devices 102A-C and server host 104 may be in communication with each other via one or more wired and/or wireless connections to network 106. Network 106 may be, e.g., an Ethernet network, any suitable LAN (local area network), the Internet, any suitable WAN (wide area network), or any suitable combination thereof. In other embodiments, one or more of client devices 102A-C may alternatively be connected directly to server host 104 (i.e., without connections to network 106). In some embodiments, resources 108A-C may be connected to network 106 via one or more wired and/or wireless connections, allowing either a client device 102A-C and/or server 104 to communication therewith. In other embodiments, as described below, resources 108A-C may not be connected to network 106 (the dashed line in FIG. 1 accordingly indicates that each of resources 108A-C may or may not be connected to network 106). More or less client devices 102A-C and/or resources 108A-C than those shown in FIG. 1 may be included in system 100.

Resources 108A-C may include, in some embodiments, one or more storage devices, processors, programmable logic controllers (PLCs), and/or the like. For example, in some embodiments, the resources may include upwards of 200 PLCs. In other embodiments, resources 108A-C may be other types of heterogeneous devices and/or assets. For example, resources 108A-C may be a fleet of motor vehicles or a group of parts for an assembly line. One or more of resources 108A-C may be a different device or asset than the other of resources 108A-C. Resources 108A-C may also be all of the same type of device or asset, but one or more may be configured differently or have different features than one or more of the others. That is, one or more of resources 108A-C may have different capabilities, capacities, and/or combinations of features than one or more of the other of resources 108A-C.

Client devices 102A-C may each include a processor and a memory and may be, e.g., a personal computer, a smart device, or the like. Each of client devices 102A-C may have a respective client application 103A-C stored and executable thereon. Client applications 103A-C may be identical to each other. Any one or more of client devices 102A-C may be configured to perform any one or more of the following when executing respective client application 103A-C: (1) send to server host 104 a request for one or more resources 108A-C; (2) receive from server host 104 a communication granting direct and/or exclusive access to the requested resource(s); (3) establish direct and/or exclusive access to the requested resource(s); (4) communicate commands and data to and receive data from the requested resource(s)

bypassing any communication with and/or control by server host 104; (5) terminate direct and/or exclusive access to the requested resource(s); and/or (6) send a communication to server host 104 releasing the requested resource(s) in response to terminating the direct and/or exclusive access.

Figure 2:
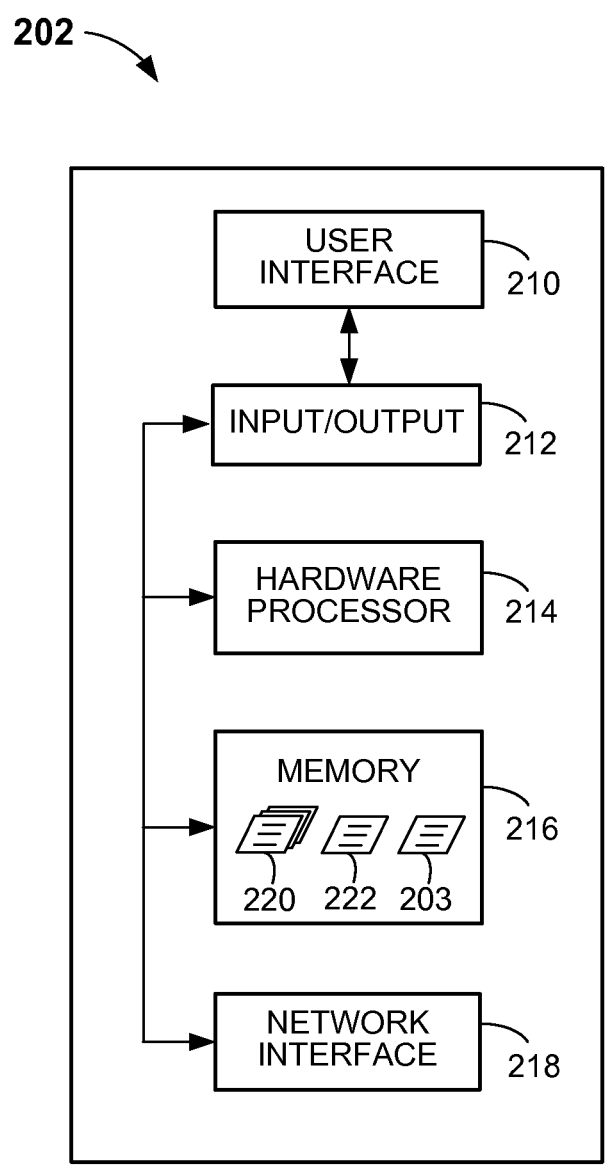
FIG. 2 illustrates a block diagram of a client device according to embodiments.

FIG. 2 illustrates a client device 202 that may be used in system 100 in accordance with one or more embodiments. Client device 202 may be a personal computer, a smart device, or any suitable general purpose or special purpose device capable of performing the functions described herein. Client device 202 may include a user interface 210, an input/output device 212, a hardware processor 214 (which may be a microprocessor, digital signal processor, controller, etc.), a memory 216 (which may include RAM (random access memory), ROM (read only memory), one or more hard disks, one or more removable disks, etc.), and a network interface 218. User interface 210 may include, e.g., a graphical user interface, and input/output device 212 may include, e.g., a display unit and soft keys, a keyboard, and/or keypad. Hardware processor 214 may execute programming instructions that may be stored in memory 216. Memory 216 may be suitable for storing one or more programs 220, data 222, and a client application 203, which may be identical to any one of client applications 103A-C. Programs 220 may, in some embodiments, include one or more test programs configured to run on one or more of resources 108A-C. Network interface 218 may be configured to establish communication with network 106 and/or any other suitable communications network. Client device 202 may also include in some embodiments, other suitable communications interfaces for communicating directly with resources, other devices, servers/computers, and/or peripherals. Client device 202 may additionally or alternatively include other suitable components. In some embodiments, client device 202 in conjunction with client application 203, one or more programs 220, and data 222 may be configured to test, e.g., resource firmware on one or more resources 108A-C.

Returning to FIG. 1, server host 104 may include a processor and a memory and may be any suitable computer, controller, or like device. Server host 104 may have a library of records stored therein that uniquely identify each one of the plurality of heterogeneous resources 108A-C. In some embodiments, each record may uniquely identify a respective resource. Server host 104 may have a server application 105 residing thereon that when executed by the processor of server host 104 may configure server host 104 to perform any one or more of the following: (1) receive a request from any one of client devices 102A-C for one or more of resources 108A-C; (2) determine whether the requested resource(s) is/are available; (3) queue the request in response to determining that one or more of the requested resources is/are not available; and (4) grant the requesting client device 102A-C direct and/or exclusive access to the requested resource(s) in response to determining that the requested resource(s) is/are available.

Figure 3:
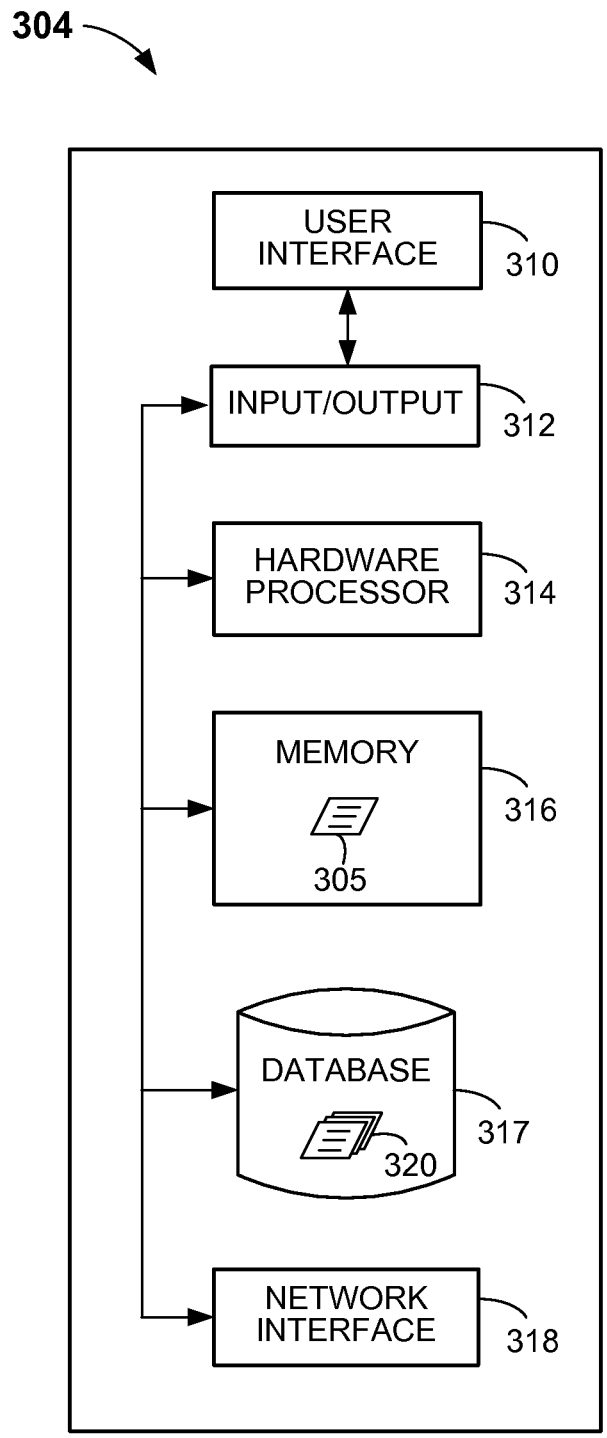
FIG. 3 illustrates a block diagram of a server host according to embodiments.

FIG. 3 illustrates a server host 304 that may be used in system 100 in accordance with one or more embodiments. Server host 304 may be any suitable general purpose or special purpose device capable of performing the functions described herein. Server host 304 may include a user interface 310, an input/output device 312, a hardware processor 314 (which may be a microprocessor, digital signal processor, controller, etc.), a memory 316 (which may include RAM, ROM, one or more hard disks, one or more removable disks, etc.), an optional database 317, and a network interface 318. Hardware processor 314 may execute programming instructions that may be stored in memory 316. Memory 316 may be suitable for storing a server application 305 and one or more programs and/or data (not shown). Server application 305 may be identical to server application 105. Database 317 may contain records 320 that may uniquely identify each one of resources 108A-C. In those embodiments not having database 317, records 320 uniquely identify each one of resources 108A-C may alternatively be stored in memory 316. In some embodiments, records 320 may include identification/selection criteria for each resource 108A-C including, e.g., any one of a resource model number, a resource address (which may be an IP (Internet Protocol) address), an amount of memory available in a resource, an I/O (input/output) configuration of a resource, and/or a selection of optional modules attached to a resource. Any suitable database application may be used in server host 304. Network interface 318 may establish communication with network 106 and/or any other suitable communications network. Server host 304 may also include in some embodiments, other suitable communications interfaces for communicating directly with resources, client devices, other devices, servers/computers, and/or peripherals. Server host 304 may additionally or alternatively include other suitable components. Server host 304 in conjunction with server application 305 may be configured to grant direct and/or exclusive access and/or control of one or more resources 108A-C to a client device 102A-C that requested those one or more resources 108A-C.

Figure 4A:
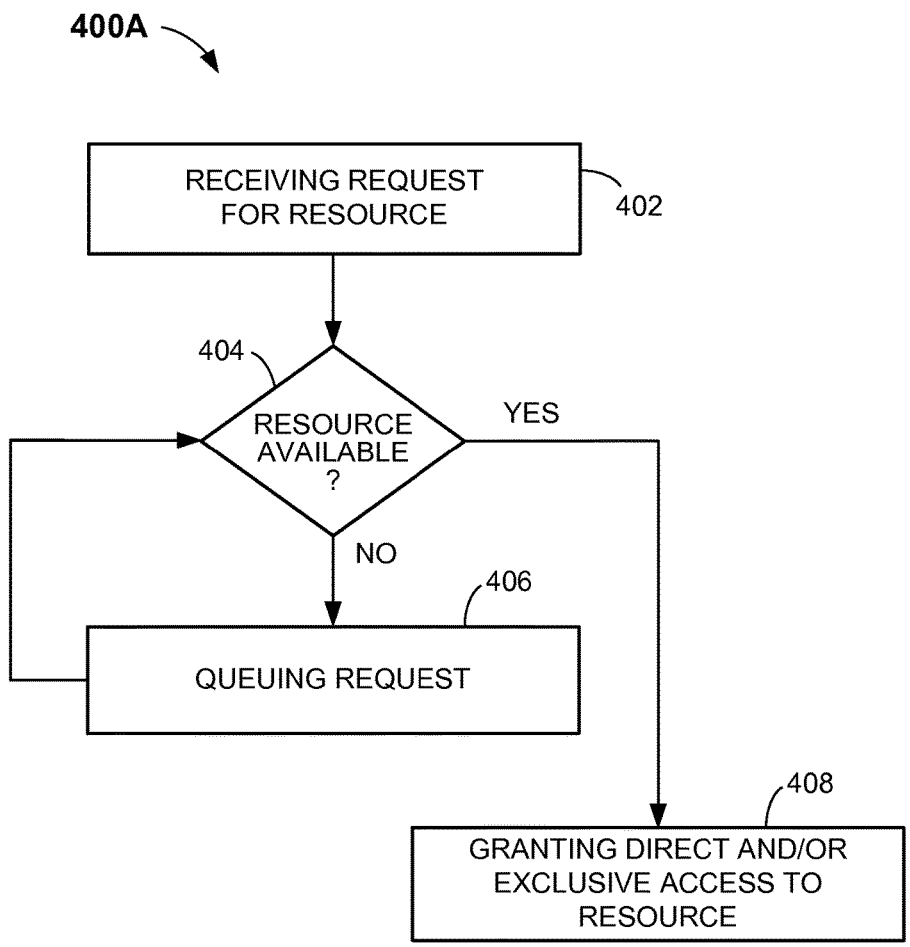
FIGS. 4A and 4B each illustrate a flowchart of a method of allocating heterogeneous resources according to embodiments.

FIG. 4A illustrates a flowchart of a method 400A of allocating heterogeneous resources in accordance with one or more embodiments. Method 400A may include at process block 402 a server host receiving a request from a first client device for a first resource of a plurality of heterogeneous resources. The server host may be, e.g., server host 104 or 304 of FIGS. 1 and 3, respectively, and the server host may be executing server application 105 or 305. The request may include, e.g., one or more of a resource model number, a resource address, an amount of memory available in a resource, an I/O (input/output) configuration of a resource, or a selection of modules attached to a resource. The first client device may be, e.g., any one of client devices 102A-C or 202 of FIGS. 1 and 2, respectively. The first resource may be, e.g., any one of resources 108A-C of FIG. 1. In some embodiments, the requested resource may be a particularly configured programmable logic controller. In some embodiments, the server host and the client device may be the same physical device. That is, the client-server application may reside on the same computer device.

At decision block 404, method 400A may include the server host determining whether the first resource is available. In some embodiments, the server host may determine the availability of a requested resource by checking the status of the requested resource as indicated in records maintained by the server host. For example, the server host may be server host 304, which maintains records 320. Records 320, in addition to uniquely identifying each resource, may also indicate the current availability status of each resource. Server host 304 may update records 320 to indicate current availability as each resource is allocated to and released from a client device. Thus, when a request for a resource is received, server host 304 may be configured via server application 305 to check records 320 to determine the availability of that requested resource. In some embodiments, the server host may poll one or more resources that satisfy the selection criteria to determine resource availability. Those one or more resources may be in communication with the server host either directly or via a network, such as network 106. In some embodiments, the server host may poll each client device to determine whether or not any one of the polled client devices is accessing a requested resource. Alternatively, any suitable technique of determining availability of resources may be used.

If the server host determines at decision block 404 that the first resource is not available, method 400A may proceed to process block 406, where the server host may queue the request. In some embodiments, the queued request may be stored at the server host. For example, the server host may be server host 304 and the queued request may be stored in memory 316 or database 317 in response to the server host determining that the first resource is not available. Alternatively, the request may be queued at another suitable location or device. Any suitable queuing algorithm or technique may be used. In some embodiments, method 400A may return to decision block 404 to process queued requests in response to receiving a release of a resource from another client device. For example, if the first resource had been previously allocated to a second client device, and the server host receives a release of the first resource from the second client device, method 400A may return to decision block 404 to process the queued request for the first resource received from the first client device. In some embodiments, method 400A may return to decision block 404 with one or more queued requests to check the availability of requested resources based on either a suitable periodic or predetermined time schedule and/or priority scheme (wherein, e.g., certain client devices and/or tasks have priority over other client devices and/or tasks).

If the server host determines at decision block 404 that the first resource is available, either in response to receiving the request or at a later time after the request had been queued at process block 406, method 400A may proceed to process block 408. At process block 408, method 400A may include the server host granting the first client device direct and/or exclusive access to the first resource in response to the server host determining that the first resource is available. This granting of access may enable the first client device to bypass the server host and interact directly with the first resource. For example, referring to system 100 of FIG. 1, in response to server host 104 granting client device 102B access to resource 108A, client device 102B may bypass server host 104 and establish direct and/or exclusive access to resource 108A via network 106 to interact directly and/or exclusively with allocated resource 108A. In some embodiments, client device 102B may establish direct and/or exclusive access to resource 108A independent of server host 104 and network 106.

In some embodiments, a non-transitory computer-readable medium, such as, e.g., a removable storage disk or device may include computer instructions capable of being executed in a processor and of performing method 400A.

Figure 4B:
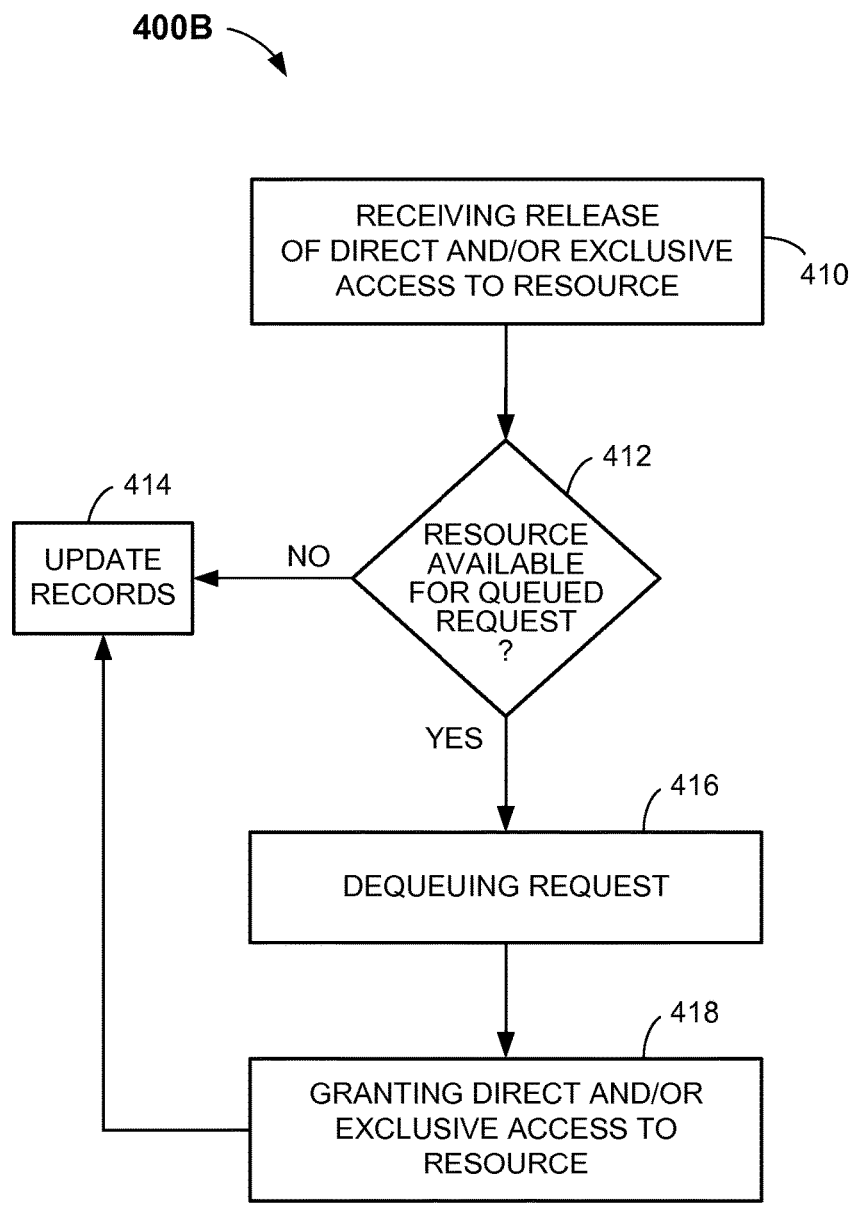

FIG. 4B illustrates a flowchart of another method 400B of allocating heterogeneous resources in accordance with one or more embodiments. Method 400B may include at process block 410 a server host receiving a release from a client device of direct and/or exclusive access to one or more resources. As described above for method 400A, the server host may be, e.g., server host 104 or 304 of FIGS. 1 and 3, respectively. The client device may be, e.g., any one of client devices 102A-C or 202 of FIGS. 1 and 2, respectively, and the one or more released resources may be, e.g., any one or more of resources 108A-C of FIG. 1. In some embodiments, the one or more released resources may each be a specifically configured programmable logic controller. In some embodiments, the server host and the client device may be the same physical device. That is, the client-server application may reside on the same computer device.

In response to receiving a release at process block 410, method 400B may proceed to decision block 412, wherein the server host may determine whether the one or more released resources completely fulfill a queued request. For example, if a first queued request includes a request for resources A, B, and C, and resources A, B and D are released at process block 410, and resource C is currently available, then the first queued request can be completely fulfilled. If, for example, a second queued request includes a request for resources E and F, and resource E is released at process block 410, but resource F is not available, then the second queued request cannot be completely fulfilled. In some embodiments, a queued request may be queued at process block 406 of method 400A.

If the server host determines at decision block 412 that the one or more released resources either have not been previously requested or do not completely fulfill a queued request, method 400B may proceed to process block 414, where the server host may update the resource records to indicate that the one or more released resources are available. For example, the server host may be server host 304, which maintains records 320. In response to receiving a release at process block 410 and determining that there are no queued requests that can be completely fulfilled, server host 304 may update records 320 at process block 414 to indicate that the one or more released resources are now available.

If the server host determines at decision block 412 that at least one of the one or more released resources completely fulfills a queued request, method 400B may proceed to process block 416. At process block 416, the server host may dequeue the queued request. For example, the server host may be server host 304 and the queued request may be stored in memory 316 or database 317. Server host 304 may remove a queued request from the queue in response to the server host determining at decision block 412 that the queued request can be completely fulfilled. Any suitable queuing algorithm or technique may be used in connection with method 400B and process block 416.

From process block 416, method 400B may proceed to process block 418, wherein the client device whose queued request for one or more resources can be completely fulfilled may be granted direct and/or exclusive access to those resources by the server host. The one or more resources to which direct and/or exclusive access has been granted may include one or more of the released resources and possibly other available resources. For example, if a queued request includes a request for resources Y and Z, and resources X and Y are released at process block 410, and resource Z is currently available, then direct and/or exclusive access to resources Y and Z may be granted by the server host. This granting of access may enable a client device to bypass the server host and interact directly with the one or more resources as described above in connection with process block 408 of method 400A. Method 400B may proceed from process block 418 to process block 414 to update the records of the released and/or granted resources. Thus, continuing with the above example, the server host may update the records of granted resources Y and Z to indicate that they are unavailable and update the record of released resource X to indicate that it is available.

In some embodiments, a non-transitory computer-readable medium, such as, e.g., a removable storage disk or device may include computer instructions capable of being executed in a processor and of performing method 400B.

Figure 5:
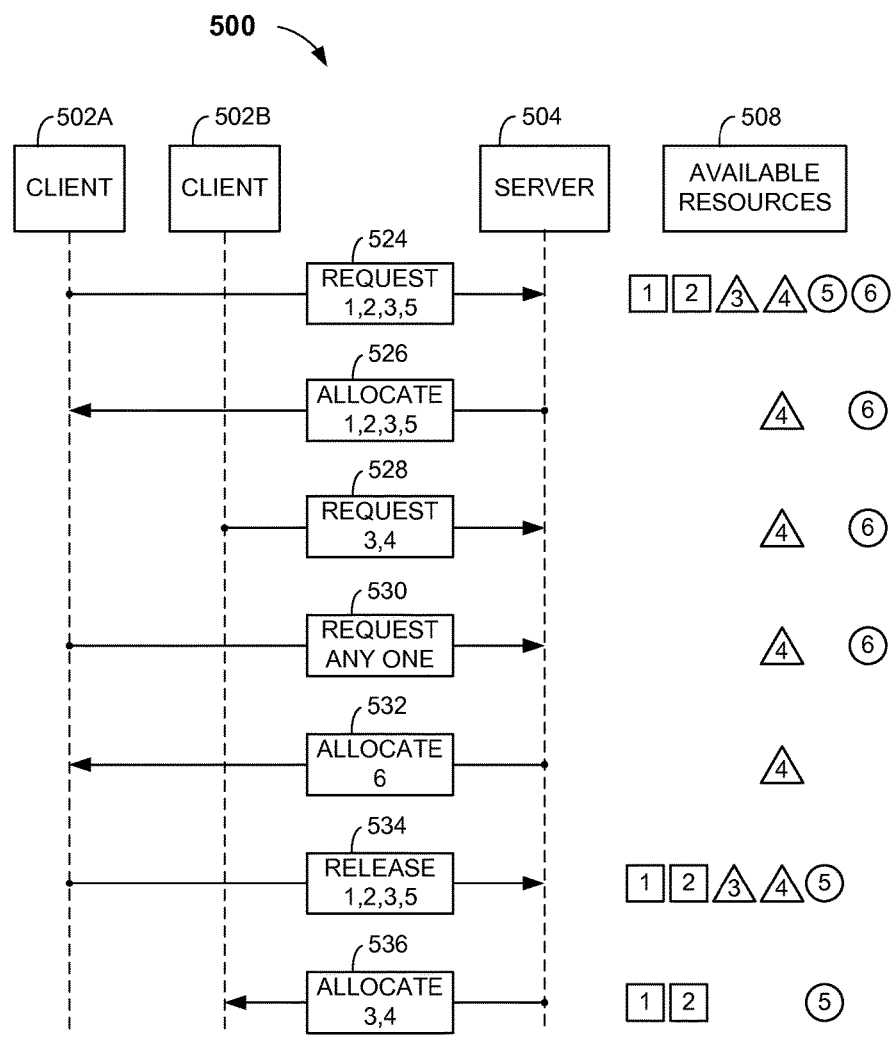
FIG. 5 illustrates a diagram of an example of allocating heterogeneous resources according to embodiments.

FIG. 5 illustrates an example 500 of allocating heterogeneous resources in accordance with one or more embodiments. Example 500 includes client devices 502A and 502B, server host 504, and available heterogeneous resources 508. Client devices 502A and 502B may each be similar or identical to client devices 102A-C or 202. Server host 504 may be similar or identical to server host 104 or 304. In some embodiments, one of client devices 502A or 502B and server host 104 may be the same computer device. Available heterogeneous resources 508 may be analogously represented by the following three different types and numbers of shapes: squares 1 and 2, triangles 3 and 4, and circles 5 and 6. Squares 1 and 2 may be identical to or different than each other, triangles 3 and 4 may be identical to or different than each other, and/or circles 5 and 6 may be identical to or different than each other.

Example 500 may begin with client device 502A issuing a request 524 for squares 1 and 2, triangle 3, and circle 5. Because squares 1 and 2, triangle 3, and circle 5 are available, server host 504 may send a communication 526 to client device 502A allocating those resources thereto. Available resources 508 may now include triangle 4 and circle 6. Next, client device 502B may issue a request 528 for triangles 3 and 4. However, because triangle 3 is not available, server host 504 may queue request 528. Client device 502A may then issue a request 530 for any one resource. In response, server host 504 may send a communication 532 allocating circle 6 to client device 502A. Upon client device 502A no longer needing squares 1 and 2, triangle 3, and circle 5, client device 502A may issue a release 534 releasing those resources. Server host 504 may now fulfill client 502B's queued request 528 by sending a communication 536 to client device 502B allocating triangles 3 and 4 thereto. As illustrated, each of client devices 502A and 502B may request, and server host 504 may allocate (i.e., grant direct and/or exclusive access to) any specific one or more of available squares 1 and 2, triangles 3 and 4, and circles 5 and 6. Continuing with the shapes analogy, more complex selection criteria may be employed in accordance with one or more embodiments. For example, particular shapes of certain size and/or color may be requested.

Figure 6:
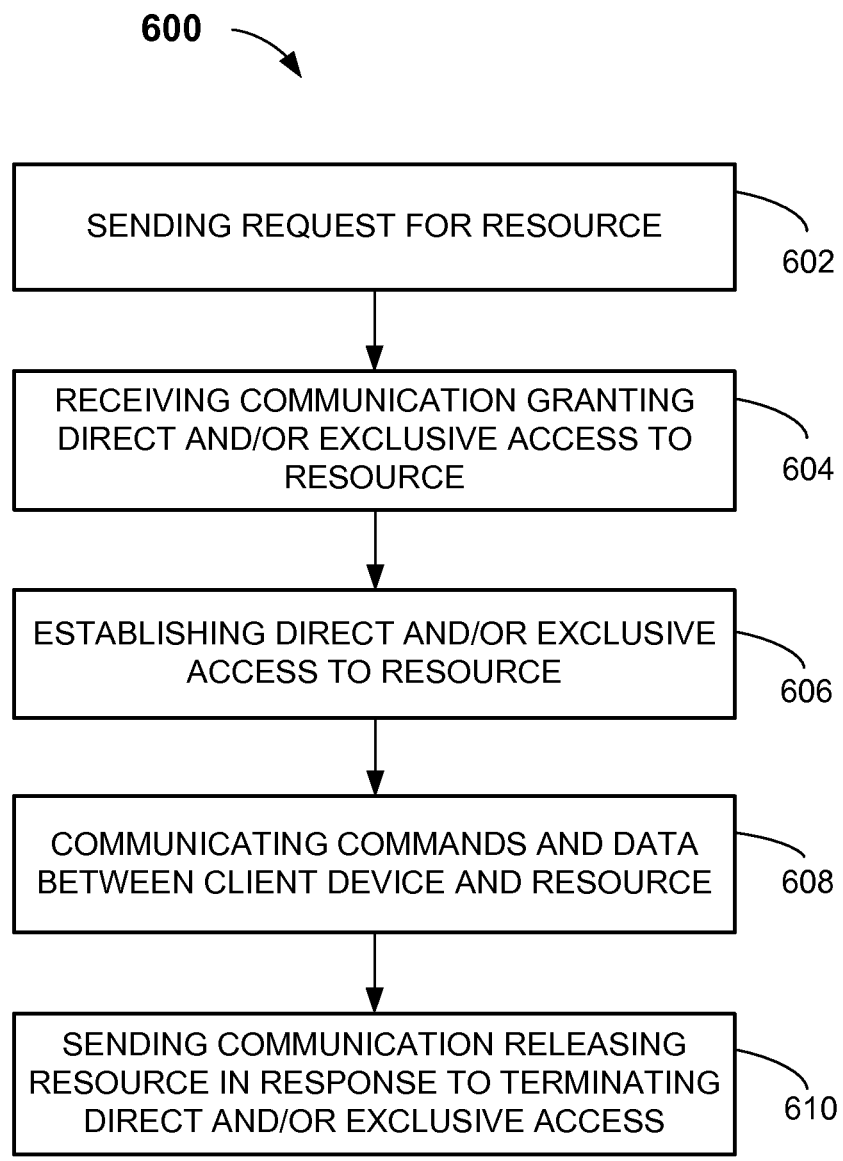
FIG. 6 illustrates a flowchart of another method of allocating heterogeneous resources according to embodiments.

FIG. 6 illustrates a flowchart of another method of allocating heterogeneous resources in accordance with one or more embodiments. Method 600 may include at process block 602 sending from a first client device to a server host a request for a first resource from a plurality of heterogeneous resources. In some embodiments, the request may include any one or more of a resource model number, a resource address, an amount of memory available in a resource, an I/O (input/output) configuration of a resource, or a selection of modules attached to a resource. For example, if the resources included programmable logic controllers (PLCs), one or more PLCs may be configured with attached modules suitable for operating convey belts, robot arms, or other machinery; opening and closing various valves; or measuring various voltages or pressures. A request for one or more of these PLCs may therefore include suitable selection criteria for identifying these PLCs. Any suitable resource selection criteria may additionally or alternatively be included in a request for one or more resources. In some embodiments, a client application may be configured to automatically generate and send a resource request based on desired resource features. For example, if a desired resource requires a certain I/O configuration as indicated in, e.g., a test program, a client application such as client applications 103A-C or 203 may automatically generate and send a resource request including suitable selection criteria for the desired I/O configuration.

At process block 604, method 600 may include receiving at the first client device a first communication from the server host granting direct and/or exclusive access to the first resource. In some embodiments, the first communication may include an address of the first resource. The address may be an IP (Internet Protocol) address. The first communication may include any suitable alternative or additional information that enables the first client device to obtain direct and/or exclusive access to the first resource.

At process block 606, the first client device may establish direct or exclusive access to the first resource by the first client device in response to receiving the first communication. For example, a user may execute a computer program stored at the first client device that connects to the first resource via a network, such as, e.g., network 106 to establish direct and/or exclusive communication with the first resource. In some embodiments, the connection between the first client device and the first resource may not include a network.

At process block 608, method 600 may include communicating commands and data between the first client device and the first resource, bypassing the server host, in response to the establishing direct and/or exclusive access. The commands and data exchanged between the first client device and the first resource may result from the execution of, e.g., one or more test programs involving the first resource. In some embodiments, a user operating the first client device may test, e.g., resource firmware on the first resource, which may be a programmable logic controller configured with certain features relevant to the firmware to be tested. Commands and data from the first client device may be communicated to the first resource and resulting data from the first resource may be communicated back to the first client device. These communications between the first client device and the first resource may be direct and/or exclusive (i.e., without involvement by the server host).

At decision block 610, the first client device may send a second communication to the server host releasing the first resource in response to the first client device terminating the direct and/or exclusive access. The first client device may terminate the direct and/or exclusive access to the first resource upon completion of one or more programs or tasks executed by the first client device and/or the first resource. Other events may additionally or alternatively trigger the first client device to terminate the direct and/or exclusive access to the first resource. In some embodiments, the termination of access to the first resource may be manually performed by a user. In some embodiments, the first client device executing a client application residing thereon, such as, e.g., client application 103A-C or 203, may automatically notify the server host to release the first resource in response to the first client device terminating the direct and/or exclusive access thereto. This may prevent a resource that is no longer needed by a client device from having an unavailable status because the server host had not been notified otherwise.

In some embodiments, a non-transitory computer-readable medium, such as, e.g., a removable storage disk or device may include computer instructions capable of being executed in a processor and of performing method 600.

In some embodiments, a non-transitory computer-readable medium, such as, e.g., a removable storage disk or device may include computer instructions capable of being executed in a processor and of performing one or more of methods 400A, 400B, and/or 600.

Persons skilled in the art should readily appreciate that the invention described herein is susceptible of broad utility and application. Many embodiments and adaptations of the invention other than those described herein, as well as many variations, modifications, and equivalent arrangements, will be apparent from, or reasonably suggested by, the invention and the foregoing description thereof, without departing from the substance or scope of the invention. For example, although described generally in connection with allocating heterogeneous electronic resources, one or more embodiments of the invention may be used in other networked environments having other types of resources, such as, e.g., inventory management systems, assembly process systems, air-traffic management systems, and vehicle-fleet management systems. Accordingly, while the invention has been described herein in detail in relation to specific embodiments, it should be understood that this disclosure is only illustrative and presents examples of the invention and is made merely for purposes of providing a full and enabling disclosure of the invention. This disclosure is not intended to limit the invention to the particular apparatus, devices, assemblies, systems or methods disclosed, but, to the contrary, the intention is to cover all modifications, equivalents, and alternatives falling within the scope of the invention, as defined by the following claims.

What is claimed is:

1. A resource allocation system, comprising:
a client device comprising a processor and a memory storing one or more programs, data and a client application;
a plurality of heterogeneous resources including a first resource, wherein the plurality of heterogeneous resources includes a plurality of programmable logic devices (PLCs); and
a server host comprising a processor and a memory, the server host in communication with the client device, the server host configured to:
receive a request from the client device for the first resource;
determine whether the first resource is available;
queue the request in response to the server host determining that the first resource is not available; and
grant the client device direct or exclusive access to the first resource in response to the server host determining that the first resource is available,
wherein the client device is configured to bypass the server host and establish direct access to the first resource to interact directly with the first resource in response to the server host granting direct access to the client device,
wherein the client device and the first resource are configured to communicate commands and data between each other, bypassing the server host, in response to an established direct access, wherein commands and data from the client device are communicated to the first resource and resulting data from the first resource are communicated back to the client device, and
wherein the client device in conjunction with the client application, the one or more programs and data is configured to test resource firmware on the first resource, the first resource being a programmable logic controller configured with features relevant to the firmware to be tested.

2. The system of claim 1, wherein the client device is configured to establish exclusive access to the first resource in response to the server host granting exclusive access to the client device.

3. The system of claim 1 wherein the request for the first resource comprises at least one of a resource model number, a resource address, an amount of memory available in a resource, an T/O (input/output) configuration of a resource, or a selection of modules attached to a resource.

4. The system of claim 1, wherein the plurality of programmable logic devices (PLCs) includes at least two PLCs configured differently than each other and the other of the plurality of PLCs.

5. The system of claim 1 wherein the server host comprises records uniquely identifying each one of the plurality of heterogeneous resources.

6. The system of claim 1, wherein the server host is further configured to receive a communication from the client device indicating that the first resource is available in response to the client device terminating the direct or exclusive access.

7. A method of allocating heterogeneous resources, comprising:
receiving at a server host a request from a first client device for a first resource of a plurality of heterogeneous resources, wherein the plurality of heterogeneous resources includes a plurality of programmable logic devices (PLCs), wherein the request for the first resource comprises a request for a specifically-configured programmable logic controller;
determining by the server host whether the first resource is available;
queuing the request at the server host in response to the server host determining that the first resource is not available; and
granting the first client device direct or exclusive access to the first resource in response to the server host determining that the first resource is available, wherein the client device is configured to bypass the server host and establish direct access to the first resource to interact directly with the first resource in response to the server host granting direct access to the client device, and
communicating commands and data between the first client device and the first resource, bypassing the server host, in response to the establishing direct access, wherein commands and data from the first client device are communicated to the first resource and resulting data from the first resource are communicated back to the first client device,
wherein the client device in conjunction with a client application, one or more programs and data is configured to test resource firmware on the first resource, the first resource being the specifically-configured programmable logic controller configured with features relevant to the firmware to be tested.

8. The method of claim 7 further comprising establishing exclusive access to the first resource by the first client device in response to the granting the first client device exclusive access.

9. The method of claim 8 further comprising communicating commands and data between the first client device and the first resource, bypassing the server host, in response to the establishing exclusive access.

10. The method of claim 7, wherein:
the request comprises a request for the first resource and at least one other resource of the plurality of heterogeneous resources;
the determining comprises determining by the server host in a single operation whether the first resource and the at least one other resource are available;

the queuing comprises queuing the request in response to the server host determining that any one of the first resource and the at least one other resource is not available; and the granting comprises granting the first client device direct or exclusive access to the first resource and the at least one other resource in response to the server host determining that the first resource and the at least one other resource are available.

11. The method of claim 7 wherein the granting the first client device direct or exclusive access to the first resource comprises communicating an address of the first resource from the server host to the first client device.

12. The method of claim 7 wherein the granting the first client device direct or exclusive access to the first resource comprises granting the first client device direct or exclusive access to the first resource in response to the server host receiving a communication from a second client device indicating that the first resource is available.

13. A non-transitory computer-readable medium comprising computer instructions capable of being executed in a processor and of performing the method of claim 7.

14. A method of allocating heterogeneous resources, comprising:

sending from a first client device to a server host a request for a first resource of a plurality of heterogeneous resources, wherein the plurality of heterogeneous resources includes a plurality of programmable logic devices (PLCs);

receiving at the first client device a first communication from the server host granting direct or exclusive access to the first resource;

establishing direct or exclusive access to the first resource by the first client device in response to receiving the first communication, the client device being configured to bypass the server host and establish direct access to the first resource to interact directly with the first resource;

communicating commands and data between the first client device and the first resource, bypassing the server host, in response to the establishing direct or exclusive access, wherein commands and data from the first client device are communicated to the first resource and resulting data from the first resource are communicated back to the first client device; and sending a second communication from the first client device to the server host releasing the first resource in response to the first client device terminating the direct or exclusive access, wherein the client device in conjunction with a client application, one or more programs and data is configured to test resource firmware on the first resource, the first resource being a programmable logic controller configured with features relevant to the firmware to be tested.

15. The method of claim 14 wherein the request for a first resource comprises a request for a specific individual resource.

16. The method of claim 14 further comprising queuing the request at the server host in response to the server host determining that the first resource is not available.

17. The method of claim 14 further comprising granting a second client device direct access to the first resource by the server host in response to the server host receiving the second communication from the first client device indicating that the first resource is available.

18. A non-transitory computer-readable medium comprising computer instructions capable of being executed in a processor and of performing the method of claim 14.

* * * * *